Figure 1:
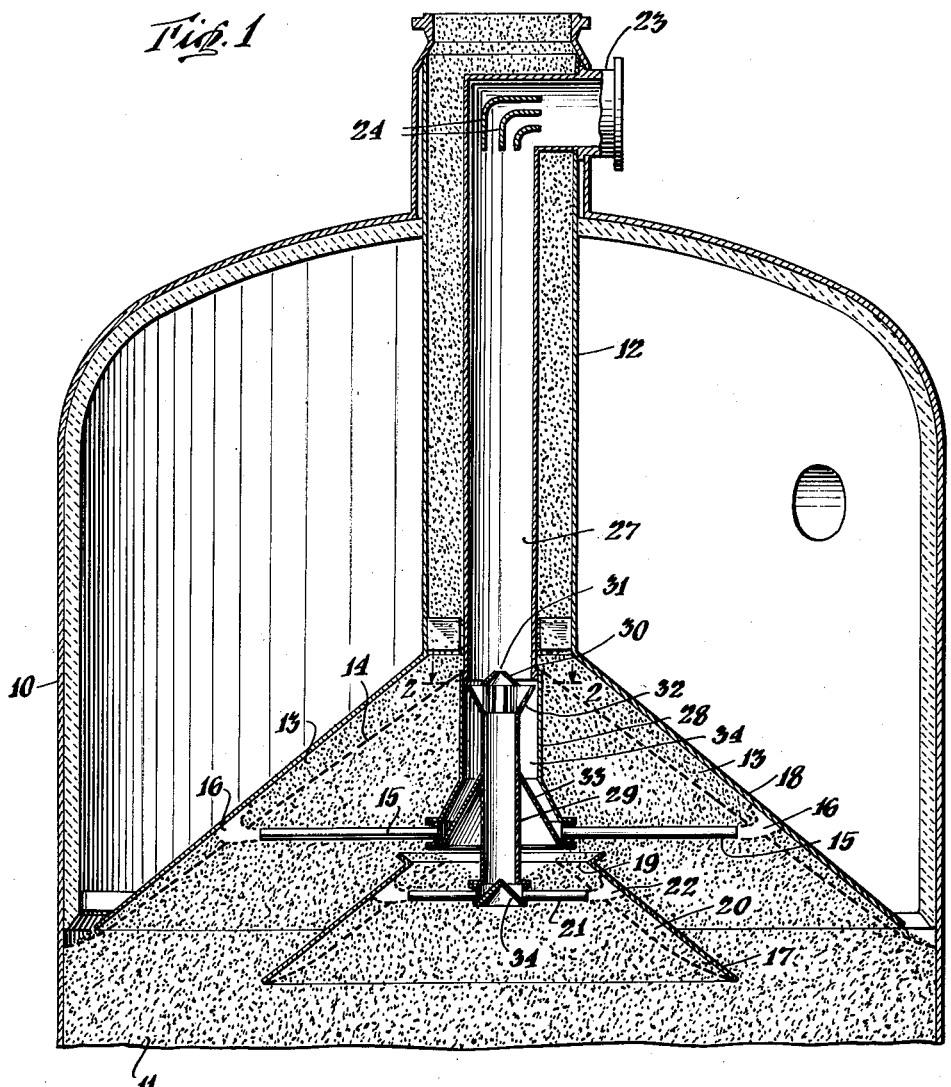

April 23, 1957    E. V. BERGSTROM ET AL    2,789,889
FLUID REACTANT FEED MANIFOLD
Filed Dec. 19, 1955

INVENTORS
Eric V. Bergstrom
Edward R. J. Sorf
BY Andrew L. Gabriault
ATTORNEY

United States Patent Office 2,789,889
Patented Apr. 23, 1957

2,789,889
FLUID REACTANT FEED MANIFOLD

Eric V. Bergstrom, Short Hills, and Edward R. J. Sorf, Fanwood, N. J., assignors to Socony Mobil Oil Company, Inc., a corporation of New York Application December 19, 1955, Serial No. 553,864

2 Claims. (Cl. 23—288)

This invention is concerned with an apparatus for the introduction of fluid reactants into enclosed chambers. Particularly, this invention relates to an apparatus suitable to divide a fluid reactant into two portions of desired magnitude and to supply those portions to separate points within the chamber. More particularly, this invention relates to such an apparatus suitable for supplying a hydrocarbon reactant as a mixture of liquid and vapor to a conversion chamber.

Typical of the processes to which this invention may be applied is the catalytic conversion of high boiling fluid hydrocarbons to lower boiling gasoline-containing hydrocarbons, in which a hydrocarbon charge is supplied to a moving compact bed of granular catalytic material. Other typical processes include hydrogenation, dehydrogenation, polymerization, isomerization, alkylation and the like, in the presence of a granular catalytic material, and thermal cooking, cracking or visbreaking of fluid hydrocarbons in the presence of a granular inert material.

Contact material suitable for such processes includes natural or treated clays, bauxite, activated alumina and synthetic associations of silica, alumina and magnesia and combinations thereof, to which certain metals or metallic oxides or sulfides may be added in smaller quantities for specific purposes. Suitable inert contact material includes refractory materials, fused alumina and coke, as well as stones or metallic particles.

This invention will find application where the contact material used is within the size range 1 inch to 100 mesh and preferably 4 to 20 mesh by Tyler Standard Screen Analysis. The term "granular" is used in describing and claiming this invention to include contact material of this size, whether of regular or irregular shape.

There has recently been developed an improved method for the supply of hydrocarbon charge to moving masses of granular contact material. This method is described in U. S. patent application, Serial Number 536,974, filed September 27, 1955. Broadly, this invention involves supplying the fluid hydrocarbons to the moving mass by injecting them directly in the moving mass to form one or more vapor bubbles, in and around which the reactant and contact material are thoroughly mixed. These bubbles are situated within a narrow high speed layer of contact material which carries a major portion of the contact material flow. In one of its more preferred species, this development involves injecting the hydrocarbon charge as a mixture of liquid and vapor at two separate levels within the moving mass. For proper operation, it is necessary that one of these levels be supplied with substantially less of the charge than the other. This makes it necessary to, in some way, subdivide the charge.

We have found that conventional methods, such as the use of orifices, are not satisfactory for this purpose. We have found that this is due to the fact that the liquid portion of the charge frequently concentrates along the walls of the conduit carrying the charge upstream of the level of subdivision. This occurs even when the conduit is vertical and defeats all attempts to obtain a representative mixture of liquid and vapor at each of the two levels with conventional designs.

A major object of this invention is to provide an apparatus for the supply of fluid reactants in predetermined quantities to two different points within an enclosed chamber.

Another object of this invention is to provide an apparatus for the subdivision of hydrocarbon charge existing as a mixture of liquid and vapor into two quantities of predetermined size, each representative of the total mixture.

These and other objects of this invention will be apparent from the following description.

Broadly, in this invention, there is provided a vertical conduit equipped with an enlarged or expanded lower section. The fluid reactant is supplied to the upper end of this conduit. Within the enlarged lower section is situated a second vertical conduit. Both of these conduits are closed off at their lower ends. In addition, the upper end of the second conduit is at least partially closed off. From this second conduit a plurality of spaced-apart passageways extend outwardly and terminate in upwardly facing inlet ends which are at least partially beneath the lower end of the first conduit. At least one pipe extends from the first conduit at a level below the inlet ends of these first passageways into the surrounding chamber. At least one pipe also extends from the second conduit at a level below these passageways to a second point within the chamber. By this construction reactant flows down the first pipe and is split at the level of the inlet ends of the passageways and flows into the chamber through the pipes. A representative sampling of liquid is obtained, since the liquid portion which may concentrate along the walls of the first conduit will drop into the passageways.

Figure 2:
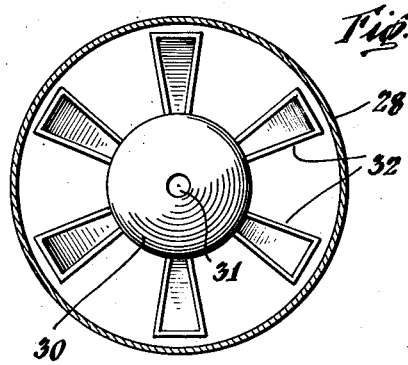

This invention will be best understood by referring to the attached drawings, of which Figure 1 is an elevational sectional view of the upper end of a hydrocarbon conversion reactor employing this invention; and Figure 2 is a sectional view along line 2—2 of Figure 1.

Both of these drawings are diagrammatic in form and like parts in both bear like numerals.

Considering both of these figures together, reactor shell 10 confines the compact reaction bed 11 within its lower section. Hot contact material enters through a central vertical conduit 12 and gravitates downwardly and is expanded outwardly beneath confining hood 13 to supply contact material to the upper end of reaction bed 11. Contact material is continuously withdrawn from the lower end of the bed in conventional manner. As it expands the lateral flowing contact material exists as a narrow high speed layer 13, the underside of which is defined by dashed line 14. The mechanism by which this layer is formed is described more fully in application Serial Number 536,974. A portion of the hydrocarbon charge is injected into this layer from a plurality of radial pipes 15 in a manner such that a bubble 16 is formed at the outer end of each of pipes 15. These bubbles may join around their periphery or be separated. At the point of charge injection into layer 13 a substantial part of the contact material which entered through passage 12 will no longer be in the layer. In order that this contact material does not go into the reaction bed unsubjected to the hydrocarbon charge, a conical member 17 is provided with an open upper end 19 adapted to catch the contact material which escapes from layer 13 upstream of bubbles 16. A second narrow high speed layer 20 is formed by this conical member and hydrocarbon charge is supplied to this layer from pipe 21 to form bubbles 22.

A substantially larger percentage of the total contact material supply will normally flow past bubbles 16 in layer 13 than flows past bubbles 22 in layer 20. For example, 75 percent of the contact material might flow past bubble 16, while only 20–25 percent flows past bubbles 22. A small percentage may escape both rows of bubbles. It is highly desirable that the hydrocarbon charge be split between bubbles 16 and 22 in proportion to the amount of contact material flowing past each. This is not only so that the charge will be more uniformly spread across the total contact material, but also to avoid the formation of regions within the reaction bed at widely different temperatures, where reactants and contact material are themselves supplied at widely different temperatures. Substantial temperature differentials across the bed will lead to substantial overreaction of a portion of the charge and underreaction of other portions, all resulting in an inferior product. A detailed explanation of the mechanism by which this occurs is given in application Serial Number 536,974. A device which will split the hydrocarbon charge into fixed proportions is, therefore, necessary.

The charge, as a mixture of liquid and vapor, enters the system through horizontal passage 23 and is passed into vertical passage 27. In order to avoid all of the liquid being thrown onto one wall of passage 27, as the hydrocarbon stream changes direction, baffles 24 are provided. Attached to the lower end of conduit 27 is conduit 28 of larger cross-section than 27. This attachment is made in such a way that the interior surfaces of 27 and 28 are not continuous, so that any liquid flowing down the wall of 27 will drop from the lower end of the conduit and will not be transferred to the interior wall of 28. Situated with its upper end within conduit 28 is conduit 29 which is of less cross-sectional area than 27. Conduit 29 is equipped with a conical closure 30 at its upper end, having an orifice 31 at the apex of the cone. Extending radially outwardly from conduit 29 are a plurality of passages 32. These passages are rectangular in shape and extend so that at least a portion of each of them lies beneath the inside edge of conduit 27. The lower end of conduit 28 is closed off by means of member 33 and the lower end of conduit 29 is closed off with member 34. Pipes 15 extend from the lower section of conduit 28 at a level below the upwardly facing inlets of passageways 32, while pipes 21 extend from the lower section of conduit 29 at a level below passageways 32.

Passageways 32 are rectangular in shape and are so sized that the total of their horizontal cross-section, plus that of orifice 31, is a fraction of the annular area 34 between the outside of conduit 29 and the inside of conduit 28, at the level of the inlets of passages 32, approximately equal to the fraction of the total hydrocarbon charge which it is desired to inject in bubbles 22. By their shape passages 32 obtain a representative sample all across the downwardly flowing charge stream and moreover will catch a representative sample of any liquid which drips from the lower end of pipe 27.

In general, all passageways through which the mixed feed flows should be so sized as to provide a velocity throughout within the range 80 to 100 feet per second. If desired, a restriction may be provided along the length of pipes 15 and 21 to insure thorough mixing of liquid and vapor just prior to the charge entering the compact bed.

While this invention has been discussed with reference to equipment having generally circular shape, it is obviously equally applicable where the various parts have other shapes such as rectangular.

Pipes 16 and/or 21 may often in practice be so constructed that each pipe which originates in the manifold may subsequently split into two passages. This provides a construction yielding the large number of injection points desirable in liquid feed processes of this kind.

While the manifold has been described in an upright position with charge flowing downwardly into it, it is apparent that in some applications it will be possible to use this manifold rotated 180 degrees from the position shown with charge passing upwardly into it.

*Example*

One suitable design of this invention, substantially identical in form to Figures 1 and 2, was made for a T. C. C. catalytic conversion unit to process 30,000 barrels per day of a hydrocarbon feed supplied about 50 percent in the liquid phase. Conduit 27 was 18 inches outside diameter and extended downwardly to a level shortly below the upper end of hood 18. Conduit 28 was a section of 20 inch pipe with ½ inch wall thickness. Conduit 29 was 8½ inches in inside diameter. There were 6 of passageways 32 extending radially outwardly from conduit 29 and uniformly spaced apart. The outer ends of these passageways lay on a 9¼ inch radius and they were tapered outwardly from an inside lateral dimension of 1$\frac{3}{16}$ inches to 2⅛ inches. Passageways 32 were about 9 inches high at their openings into conduit 29. This manifold was designed to split the charge so that about 28 percent passed into conduit 29.

This invention should be understood to cover all changes and modifications of the examples of the invention herein chosen for purposes of disclosure which do not constitute departures from the spirit and scope of the invention.

We claim:

1. An apparatus for supplying fluid material to an enclosed chamber at at least two different points, which comprises in combination: a first vertical conduit equipped with an enlarged lower section of greater horizontal cross-section than its upper section; means for supplying fluid material to the upper end of said first conduit; a second vertical conduit situated, at least partially, within said first conduit; means for closing off at least a substantial portion of the horizontal cross-section of the upper end of said second conduit; members defining a plurality of spaced-apart passageways extending from said second conduit within the lower section of said first conduit, each of said passageways having an upwardly facing open inlet terminating within said first conduit and a discharge end in communication with the interior of said second conduit, the inlet of each of said passageways extending outwardly within the enlarged lower section of said first conduit to a point vertically beneath the inside wall of the smaller upper section of said first conduit; a closure at the lower end of said first conduit and a closure at the lower end of said second conduit; at least one pipe extending outwardly from said first conduit to the exterior thereof at a level below the inlet ends of said passageways and at least one pipe extending outwardly from said second conduit at a level below the inlet ends of said passageways, whereby hydrocarbon charge passes through said first conduit and is split into two portions at the level of said passageways, said two portions being supplied to at least two different points separately by means of said pipes.

2. An apparatus for suppling a hydrocarbon charge as a mixture of liquid and vapor to two different levels within a conversion chamber, which comprises in combination: a first vertical conduit extending downwardly into the conversion chamber; a second vertical conduit, of larger horizontal cross-section than said first conduit, attached to the exterior of said first conduit in a manner which provides for a discontinuity of interior surface between said first and second conduits, and extending downwardly to a level within said chamber beneath the lower end of said first conduit; a third conduit of less horizontal cross-section than said first conduit situated with its upper end within said second conduit, so that an annular area is formed between said second and third conduits; members closing off the lower end of said second conduit and members closing off the lower end of said third conduit; a solid member equipped with a central orifice closing off the upper end of said third conduit; a plurality of pipes extending from the lower section of said second conduit to a first level within said chamber; a second plurality of pipes extending from the lower section of said third conduit to a second level within said chamber; a plurality of spaced-apart passageways having upwardly facing open inlet ends extending from said third conduit radially outwardly to a position beneath the lower end of said first conduit so that said passageways will receive liquid flowing down the walls of said first conduit, said inlet ends being formed by completely opening the upper side of said passageways from their points of departure from said second conduit and said inlet ends being situated above the inlet ends of said first and second plurality of pipes and said passageways and said orifice having a total cross-sectional area which is a fraction of the total horizontal cross-section of the annulus between said second conduit and said third conduit equal to the fraction of the total hydrocarbon charge desired to be supplied at said second level; means for supplying hydrocarbon charge as a mixture of vapor and liquid to the upper end of said first conduit whereby vapor and liquid will flow together down said first conduit and be throttled and split between said second conduit and said third conduit and flow outwardly to said two levels in the desired amount.

No references cited.